United States Patent
Sultenfuss (10) Patent No.: US 8,065,540 B2
(45) Date of Patent: Nov. 22, 2011

(54) POWER CONTROL FOR INFORMATION HANDLING SYSTEM HAVING SHARED RESOURCES

(75) Inventor: Andrew T. Sultenfuss, Leander, TX (US)

(73) Assignee: Dell Products, LP, Round Rock, TX (US)

( * ) Notice: Subject to any disclaimer, the term of this patent is extended or adjusted under 35 U.S.C. 154(b) by 416 days.

(21) Appl. No.: 12/262,973

(22) Filed: Oct. 31, 2008

(65) Prior Publication Data

US 2010/0115314 A1    May 6, 2010

(51) Int. Cl.
*G06F 1/26* (2006.01)
(52) U.S. Cl. ........ 713/320; 713/300; 713/322; 713/323; 713/324; 710/305
(58) Field of Classification Search .......... 713/300, 713/320, 322–324; 710/305
See application file for complete search history.

(56) References Cited

U.S. PATENT DOCUMENTS

| | | | |
|---|---|---|---|
| 4,720,798 A | | 1/1988 | Reed et al. |
| 4,747,041 A | * | 5/1988 | Engel et al. .................. 713/324 |
| 4,809,163 A | * | 2/1989 | Hirosawa et al. ............. 713/323 |
| 5,251,320 A | * | 10/1993 | Kuzawinski et al. ......... 713/324 |
| 5,303,171 A | | 4/1994 | Belt et al. |
| 5,586,270 A | | 12/1996 | Rotier et al. |
| 5,644,760 A | | 7/1997 | Polzin et al. |
| 5,727,231 A | | 3/1998 | Bartley et al. |
| 5,748,912 A | | 5/1998 | Lee |
| 5,919,264 A | * | 7/1999 | Reneris ......................... 713/324 |
| 5,999,997 A | | 12/1999 | Pipes |
| 6,029,211 A | | 2/2000 | Nakashima |
| 6,078,967 A | | 6/2000 | Fulghum |
| 6,233,692 B1 | * | 5/2001 | Villanueva .................... 713/324 |
| 6,549,968 B1 | | 4/2003 | Hart |
| 6,586,849 B2 | * | 7/2003 | Tarr ................................ 307/38 |
| 6,608,400 B1 | * | 8/2003 | Muehsam ....................... 307/23 |
| 6,732,216 B2 | * | 5/2004 | Shaw ............................ 710/305 |
| 6,735,663 B2 | | 5/2004 | Watts, Jr. et al. |
| 6,735,708 B2 | | 5/2004 | Watts, Jr. |
| 6,760,852 B1 | * | 7/2004 | Gulick .......................... 713/324 |
| 6,801,974 B1 | | 10/2004 | Watts, Jr. et al. |
| 6,816,925 B2 | | 11/2004 | Watts, Jr. |
| 6,898,727 B1 | * | 5/2005 | Wang et al. ....................... 714/4 |
| 7,149,837 B2 | | 12/2006 | Watts, Jr. et al. |

(Continued)

FOREIGN PATENT DOCUMENTS

EP    1 460 529 A2    9/2004

(Continued)

OTHER PUBLICATIONS

Hewlett-Packard. Power Regulator for ProLiant. Technology Overview. Revision 2. Jun. 2005.*

(Continued)

*Primary Examiner* — Matthew Spittle
(74) *Attorney, Agent, or Firm* — Larson Newman, LLP (57) ABSTRACT

An information handling system includes at least two processing systems that share system resources. In response to detecting a designated event, a power control module of the information handling system can select one of a plurality of available power profiles. The power profile can be selected based on the event and state information indicative of a state of the processing systems. Based on the selected profile, the power control module can set an operational power mode of one or more of the shared system resources.

17 Claims, 4 Drawing Sheets

U.S. PATENT DOCUMENTS

| | | | |
|---|---|---|---|
| 7,197,584 B2 | 3/2007 | Huber et al. | |
| 7,281,148 B2 * | 10/2007 | Munguia | 713/322 |
| 7,380,142 B2 * | 5/2008 | Lee et al. | 713/300 |
| 2002/0103005 A1 | 8/2002 | Watts, Jr. et al. | |
| 2003/0110306 A1 | 6/2003 | Bailis et al. | |
| 2004/0088262 A1 | 5/2004 | Boucher et al. | |
| 2004/0160435 A1 | 8/2004 | Cui et al. | |
| 2005/0138267 A1 | 6/2005 | Bains et al. | |
| 2005/0240702 A1 | 10/2005 | Kunkel et al. | |
| 2006/0026447 A1 * | 2/2006 | Naveh et al. | 713/322 |
| 2007/0094435 A1 | 4/2007 | Fry et al. | |
| 2007/0213105 A1 | 9/2007 | Huber et al. | |
| 2008/0004889 A1 | 1/2008 | Edwards et al. | |
| 2008/0070593 A1 | 3/2008 | Altman et al. | |
| 2008/0140872 A1 | 6/2008 | Wright | |
| 2008/0272880 A1 | 11/2008 | Sutardja et al. | |
| 2009/0125732 A1 * | 5/2009 | Oya et al. | 713/300 |

FOREIGN PATENT DOCUMENTS

WO    WO 2007/004178 A1    1/2007

OTHER PUBLICATIONS

Actel Corporation. Total System Power. Evaluating the Power Profile of FPGAs. 2008.*
Garbee et al. Platform-based Power Management and Linux. HP Development Company. 2010.*
U.S. Appl. No. 12/039,872, filed Feb. 29, 2008.
U.S. Appl. No. 12/189,005, filed Aug. 8, 2008.
U.S. Appl. No. 12/188,994, filed Aug. 8, 2008.
U.S. Appl. No. 12/189,006, filed Aug. 8, 2008.
U.S. Appl. No. 12/189,000, filed Aug. 8, 2008.
U.S. Appl. No. 12/260,519, filed Oct. 29, 2008.
U.S. Appl. No. 12/261,797, filed Oct. 30, 2008.
U.S. Appl. No. 12/261,626, filed Oct. 30, 2008.

* cited by examiner

POWER CONTROL FOR INFORMATION HANDLING SYSTEM HAVING SHARED RESOURCES

FIELD OF THE DISCLOSURE

This disclosure relates generally to information handling systems, and more particularly to power control for information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Figure 1:
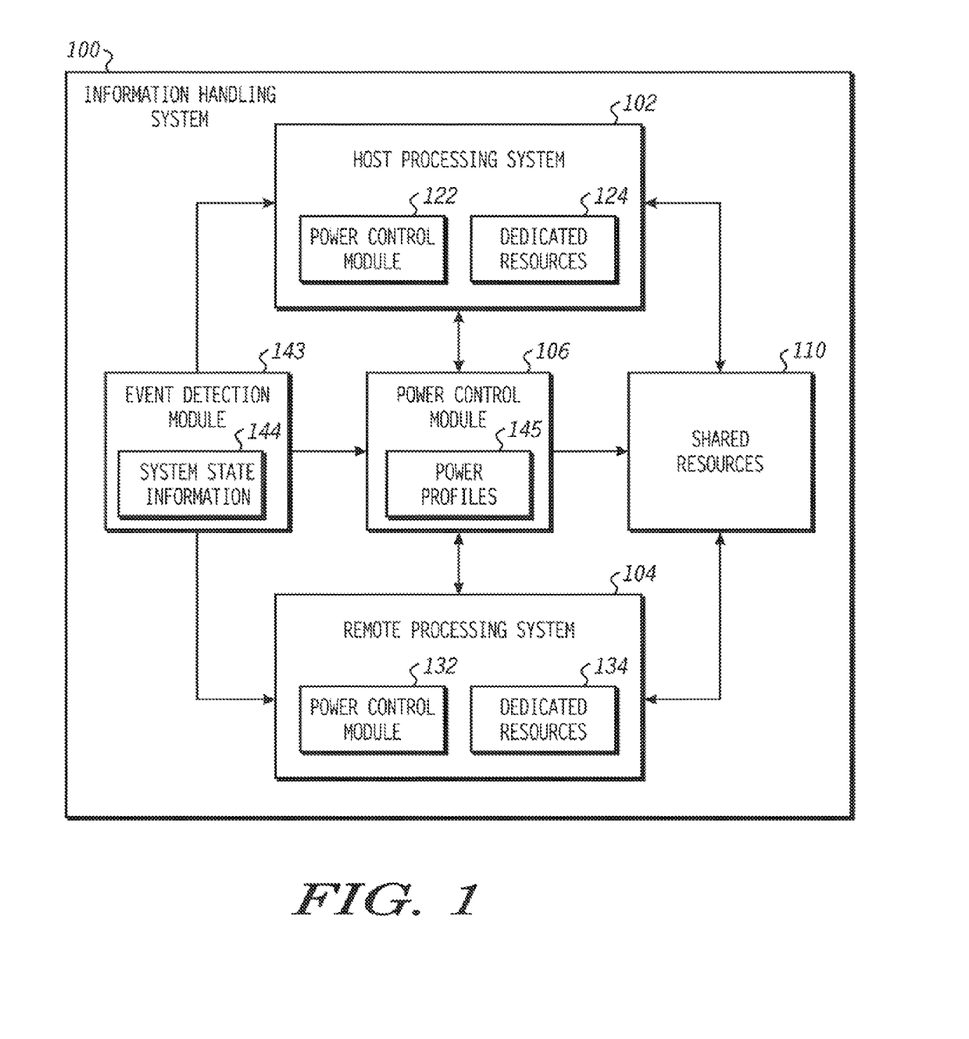
FIG. 1 illustrates a block diagram of an information handling system according to one aspect of the present disclosure.

FIG. 1 illustrates a block diagram of an information handling system 100 according to one embodiment of the present disclosure. The information handling system 100 includes a host processing system 102, a remote processing system 104, a power control module 106, an event detection module 143, and shared resources 110. The remote processing system 104 and host processing system 102 are each connected to the power control module 106, to the event detection module 143, and to the shared resources 110. In addition, the event detection module 143 and the shared resources 110 are each connected to the power control module 106.

The host processing system 102 and remote processing system 104 are independent processing systems. As used herein, an independent processing system refers to a system, such as a computer system, that is able to carry out tasks independently of other processing systems at the information handling system 100 by independently controlling system resources. The tasks executed by each processing system are specified by software or firmware executing at the associated system. In an embodiment, the host processing system and remote processing system each include an independent processor device (not shown), such as a central processing unit (CPU), CPU chipset, or the like, that is configured to operate independently of other processing units of the information handling system 100. In one embodiment, the processing systems are independent in that they do not share tasks and do not execute program threads from a common application program or operating system. In another embodiment, the processing systems independently execute different operating systems.

Host processing system 102 includes a power control module 122, and a set of dedicated resources 124. Similarly, remote processing system 104 includes a power control module 132, and a set of dedicated resources 134. The power control modules 122 and 123 are configured to set the operational power mode for the associated host processing system and set of dedicated resources. Thus, power control module 122 can set the operational power mode for the host processing system 102 and set the operational power mode for the set of dedicated resources 124. As used herein, an operational power mode refers to one of a plurality of potential power states during operation of the associated device. Thus, in different operational power modes, a device will typically consume different amounts of power, and have different functionality. Thus, for example, one of the dedicated resources 124 can be set to an active power mode and a low-power mode. In the active power mode, the dedicated resource can execute designated operations at a relatively high speed, and can consume a relatively large amount of power. In the low-power mode, the dedicated resource can execute designated operations at a reduced rate of speed, and consume a relatively small amount of power. In other low-power modes, the dedicated resource may not execute designated operations, but may retain state information from the active mode, so that when the dedicated resource returns to active mode, it is able to execute the designated operations with the retained state information.

In a particular embodiment, the power control modules 122 and 132 can set the power modes for the associated processing system and dedicated resources independently. Thus, for example, the power control module 132 can set the power mode of the remote processing system 104 to a first power mode (such as an active mode) while setting the power mode of one of the dedicated resources 134 to a second power mode (such as a low-power mode). Further, the power control module 132 can set a first dedicated resource to one power mode (such as a first low-power mode) and a second dedicated resource to a second power mode (such as a second low-power mode). In an embodiment, the remote processing system 104 and the host processing system 102 can each include multiple voltage rails (not shown) derived from a common power source, such as a battery. The power mode for a particular device can be set by connecting a power node of the device to a designated voltage rail.

Each of the dedicated resources 124 and 134, as well as the shared resources 110, includes one or more system resources. As used herein, a system resource refers to a resource of the information handling system 100 that can be employed by a processing system to perform a designated task. Examples of system resources include input/output devices, interface devices, memory devices, controller devices, and the like. In addition, a dedicated resource, as used herein, refers to a resource that cannot be directly controlled by a processing system other than the processing system to which it is dedicated. A shared resource, as used herein refers to a resource that can be controlled by any processing system with which it is shared. In an embodiment, one or more system resources can be embodied in different semiconductor substrates.

The event detection module 143 is configured to detect events at the information handling system 100. An event refers to any internal or external stimulus at a processing system. Examples of events can include a user input, receipt of a communication from a network, opening or closing of application software, or the like. In response to detecting an event, event detection module 143 accesses system state information 144, which stores information indicating the state of host processing system 102 and remote processing system 104. As used herein, the state of a processing system refers to the operational configuration of the system at a particular point in time. In an embodiment, the state information of a processing system includes information delineating any operating systems or applications being executed at the processing system, the power mode of the dedicated resources associated with the system, any tasks being executed or scheduled for execution at the processing system, and the like. In response to detecting an event, the event detection module 143 communicates event information indicating the event type and the system state information 144 to the power control module 106. The event type can include the source of the event, the timing of the event, or the like.

The power control module 106 stores a set of power profiles 145 and is configured to select one of the power profiles 145 based on received event information. Based on the selected power profile, the power control module 106 can set the power mode for any of the shared resources 110, any of the dedicated resources 124, and any of the dedicated resources 134. To set the power mode for one or more system resources, the power control module 106 communicates power control messages between remote processing system 104 and host processing system 102. Each power control message represents a request to set a power mode for a particular system resource or processing system. In one embodiment, in response to a power control message, the power control module 106 can directly set a power mode for any of the dedicated resources 124, any of the dedicated resources 134, and any of the shared resources 110. In another embodiment, in response to a power control message, the power control module can communicate messages to the power control modules 122 and 132, as appropriate, to set each system resource to the requested power mode.

In operation, in response to a designated event, the power control module 106 sets the power mode for one or more system resources. This can be better understood with reference to an example. In this example, one of the dedicated resources 124 includes a display interface set to a low-power mode. One of the shared resources 110 includes a network interface, such as a Wi-Fi interface. The remote processing system 104 interacts with the network interface while the host processing system 102 is in a low-power mode. The event detection module 143 detects that the network interface has received an incoming message, such as an email message. In response, the event detection module 143 provides event information indicating the source and timing of the event, and the system state information 143.

Based on the received event information, the power control module 106 selects a power profile. For example, the power control module 106 can determine, based on the system state information, that the host processing system 102 is in a low-power mode, and should not be placed in an active mode based on the incoming message. The power control module 106 can further determine that a notification email message should be displayed immediately via the display interface. Accordingly, the power control control module 106 communicates a message to the power control module 122, which places the display interface in the active mode. The remote processing system 104 can then request the display interface to provide a notification of the received email message via the display interface.

In response to another event of a different type, the power control module 106 can select a different power profile to maintain the display interface in the low-power state, while placing other system resources in an active state. For example, if the event is indicative of a low-battery condition or other loss of power, the power control module 106 can place an audio interface of the shared resources 110 in an active state, while maintaining the display interface in a low-power state. A warning sound can then be played via the audio interface. Thus, the power control module 106 can select a power profile, and therefore the power mode of each system resource, based on a type of event.

Further, the power control module 106 can select a power profile based on the state of each processing system, as indicated by the system state information 144. For example, if an email message is received when the system state information 144 indicates host processing system 102 is in a low-power state, the power control module 106 can select a power profile so that an indicator light is placed in an active mode, to display an indication of a received message, but a visual display interface is left in a low-power mode, so that the message itself is not displayed. If the system state information 144 indicates the host processing system is in an active mode and is executing an email application, the power control module 106 can maintain the indicator light in a low-power mode, as an indication of the received email message will be displayed by the email application.

Accordingly, the power control module 106 can select the appropriate power profile based on the type of event indicated by the event detection module 144, as well as the state of processing systems 102 and 104. The power profiles 145 can be set so that only those system resources needed to service a designated event in a designated system state are placed in an active mode, thereby reducing overall power consumption of the information handling system 100.

Figure 2:
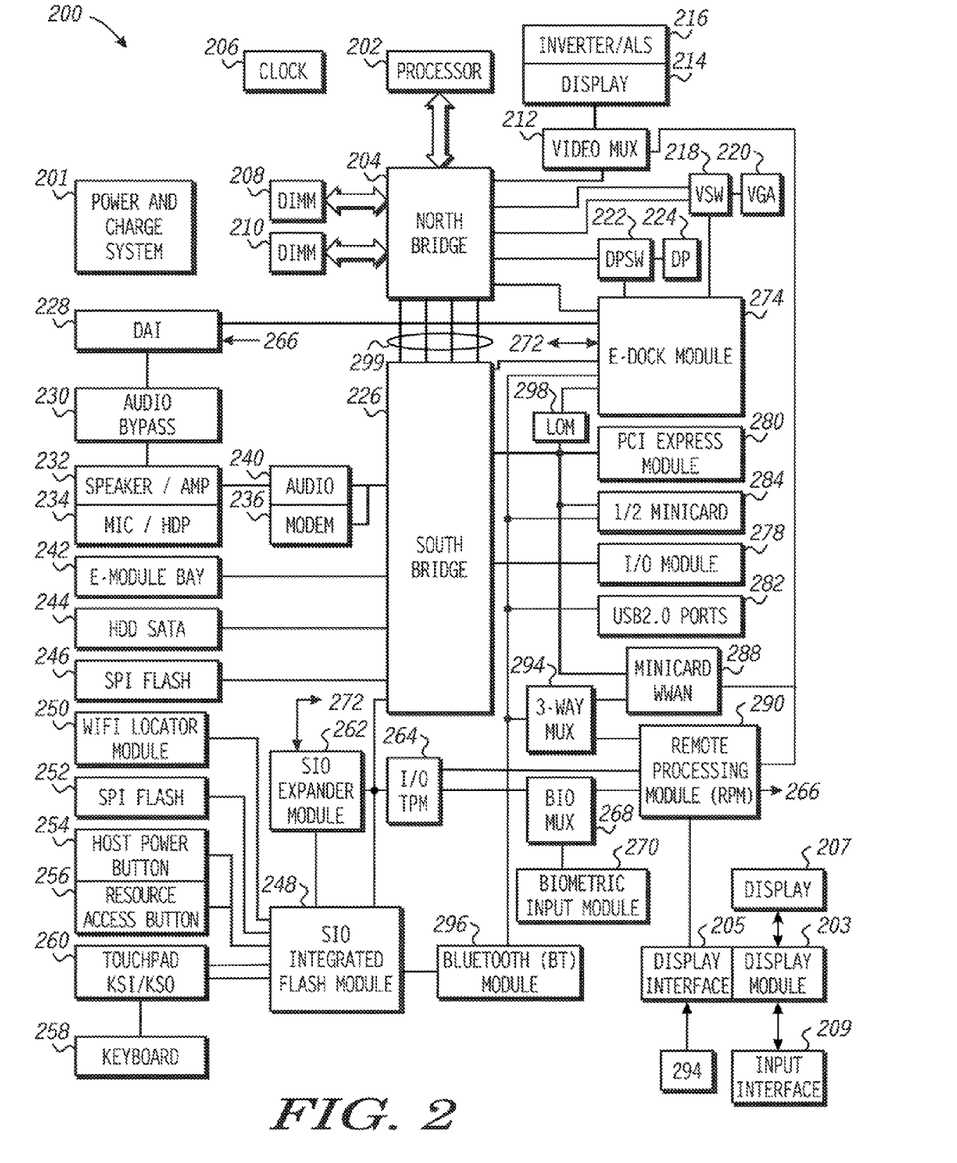
FIG. 2 illustrates a block diagram of an information handling system according to another aspect of the present disclosure.

FIG. 2 illustrates a functional block diagram of an information handling system 200 employing a flexible power control scheme as described with respect to FIG. 1. The information handling system 200 can include a processor 202 coupled to a north bridge 204. A clock 206 can output a timing signal to the processor 202 and other components or resources of the information handling system 200 as needed or required. The north bridge 204 can be further coupled to a dual in-line memory module (DIMM) 208 and a DIMM 210. The north bridge 204 can also be coupled to a video multiplexer (Video MUX) 212 operable to multiplex and output video signals to be displayed using a display 214. The display 214 can include an inverter and automatic light sensor (ALS) module 216. The north bridge 204 can be further coupled to a video switch (VSW) module 218 and a video graphics array (VGA) port 220. A display port (DP) 224 can be coupled to a display port switch (DPSW) 222 operable to be coupled to the north bridge 204, and an E-Dock module 274. The E-Dock module 274 that can be used to expand resources of the information handling system 200, and in various forms, enable access to a battery or charge source, a media slice, an I/O box, a printer interface, or various other resources that can be accessed when docking the information handling system 200 to a docking module.

The information handling system 200 can also include a south bridge 226 coupled to the north bridge 204 using a data bus 299. A digital audio interface (DAI) module 228 can receive a digital audio signal from an input source 266. In an aspect, a remote processing module 290 or other modules can be coupled to the DAI 228 to input a digital audio signal as the input source 266. For example, the DAI module 228 can also be coupled to an E-Dock module 274. An audio bypass 230 can be further coupled to a speaker and amplifier 232, and a microphone and headphone (MIC/HDP) 234. The south bridge 226 can also be coupled to a modem 236 such as an RJ-11 or plain old telephone system (POTS) enabled modem, and an audio output module 240 operable to couple audio output signals using the south bridge 226.

The south bridge 226 can be coupled to the E-Module bay 242 which can include a bay or cavity that can be used to enable couple and decouple resources that can access an internal bus of the information handling system 200 and can be further coupled to the south bridge 226. For example, the E-Module bay 242 can be coupled to the south bridge 226 using a multiplexer such as 3-way Mux 294 operable to couple a resource coupled to E-Module bay 242. Examples of resources can include disk drives, optical drives, batteries, I/O expander modules, smart card readers, and various combinations thereof. The information handling system 200 further includes a serial advanced technology attachment hard disk drive (SATA HDD) 244, and a serial peripheral interface (SPI) flash memory 246. The south bridge 226 can also be coupled to a serial I/O (SIO) integrated flash module 248. The SIO integrated flash module 248 can be coupled to a wireless fidelity (WIFI) locator module 250 which can refer to any type of 802.11x or any other short-range wireless communication. The SIO integrated flash module 248 can also be coupled to an SPI flash module 252, a host power button 254, and a resource access button interface 256 that can include one or more resource access buttons. The SIO integrated flash module 248 can also be coupled to a keyboard 258 and touch-pad and KSI/KSO module 260. An SIO expander module 262 can also be coupled to the SIO integrated flash module 248 and can further be coupled to an I/O trusted platform module (TPM) 264. The I/O TPM 264 can further be coupled to a biometric multiplexer (BIO MUX) 268, and a biometric input 270 operable to detect user biometrics (e.g. fingerprints, face recognition, iris detection, EKG/heart monitor, etc.). In other forms, the information handling system 200 can also include a security engine (not illustrated) that can be coupled to the biometric inputs using the MMPM 290 that can enable and disable access to portions or all of the information handling system 200.

According to an aspect, the E-Dock module 274 can also be coupled to the SIO integrated flash module 248 and SIO expander module 262 via interface 272. The south bridge 226 can further be coupled to an I/O module 278, a peripheral computer interconnect (PCI) express module 280 using a PCI express bus. The south bridge 226 can further be coupled to universal serial bus (USB) 2.0 access ports 282 via a host USB bus. A ½ Mini Card module 284 and a Minicard wireless wide area network (WWAN) module 288 can also be coupled to the south bridge 226 using a PCI express bus.

The information handling system 200 can further include a remote processing module (RPM) 290 operable to be coupled to a display 292. RPM 290 can be realized as RPM 104 described in FIG. 1, RPM 300 described in FIG. 4, or any other module operable as needed or desired. RPM 290 can further be configured to output a video signal to the video MUX 212 to output to the display 214. The RPM 290 can also be coupled to a three (3) way multiplexer 294. The three (3) way multiplexer 294 can multiplex USB signals of the Minicard WWAN 288, the RPM 290, and the USB bus coupled to the south bridge 204. The south bridge 226 can further be coupled to a Bluetooth (BT) module 296 via the USB bus. The south bridge 226 can also be coupled to a local area network (LAN) on Motherboard (LOM) 298 via a PCI express bus of the information handling system 200. The LOM 298 can also be coupled to the PCI express module 280. The information handling system 200 also includes a power and charge system 201 operable to distribute power to each component of the information handling system 200, and charge rechargeable power sources of the information handling system 200.

According to a further aspect, the processor 202 can represent a portion of a host processing system, such as host processing system 102 of FIG. 1. Further, processor 202 can include a power control module and event detection module, as described with respect to FIG. 1. In addition, remote processing module 290 can represent a portion of remote processing system 104 of FIG. 1, and can include a power control module and event detection module (not shown). The SIO integrated flash module 248 or other module can include a power control module such as power control module 106 of FIG. 1.

According to an aspect, the Minicard WWAN 288 and the RPM 290 can be realized as the same module or device and can be coupled to the information handling system 200 using a Minicard WWAN enabled interface.

During operation, RPM 290 can be configured to detect a user initiated event, a non-user initiated event, network events, clock events, location events, timer events, power events, or any combination thereof. For example, a user initiated event can include a user activating a key, button, or other type of hardware, software, or user selectable interface, or combinations thereof, that can generate a user activated event. For example, a user can select a button to access a messaging application of the information handling system 200. As such, the RPM 290 can detect a request to access the messaging application and the RPM 290 can initiate access to resource of the information handling system 200 during a reduced operating state of the information handling system 200.

According to another aspect, the RPM 290 can detect a non-user initiated event. For example, the information handling system 200 can employ the Minicard WWAN 288 operable to receive communication signals via a wireless communication. The Minicard WWAN 288, coupled to the RPM 290, can detect the non-user initiated event. For example, a software update can be received and an update can be initiated without user intervention. In another form, an auto-power off feature can be used with a GPS feature of the Minicard WWAN 288. The control module 248, the RPM 290, or any combination thereof, can identify a resource profile (not illustrated) of the detected event, and initiate activation of resources of the information handling system 200 to process the non-user initiated event. According to a further aspect, non-user initiated events, user initiated events, or any combination thereof can be detected.

According to an aspect, in response to an event the RPM 290 and the control module 248, or any combination thereof, can then initiate placement of resources into designated power modes based on the event. Thus, the power mode for each resource can vary in response to different kind of events. As such, the information handling system 200 need not be initialized to process all events, and a limited amount of resources can be activated.

In another form, the information handling system 200 can detect a non-user initiated event communicated to an electronic device other than the information handling system 200 during a reduced operating state of the information handling system 200. For example, the RPM 290 can be configured to detect a message formatted to be received by a smart phone device, Blackberry device, or any type of electronic device configured to receive messages. For example, the information handling system 200 employing the Minicard WWAN 288 operable to detect wireless messages communicated via any network operable to communicate messages. For example, a wireless messaging network such as an SMS network, Blackberry enabled network, or any other type of messaging enabled wireless or wireline network. In another form, the MMPM 290 can be wirelessly enabled to receive and transmit wireless communication signals. As such, the Minicard WWAN 288 may not be enabled to receive wireless communications.

In an exemplary form, the information handling system 200 can be operating in a low-power operating state that can include sufficient resources to detect a wireless signal. As such, the RPM 290 can determine a current operating state of the information handling system 200, and can initiate placing resources in an appropriate power mode to process and output a response to the received wireless signal. As such, an operating environment to output a response to a message, such as a Blackberry message, can be enabled using a limited amount of resources without having to initialize additional resources of the information handling system 200. For example, the RPM 290 in combination with the control 248 can be used to place the display 214 in an appropriate power mode to output a received message. Additionally, the keyboard 258 or other input devices of the information handling system 200 can be placed in an active mode to enable a user to view and respond to a message. As such, a limited resource operating environment can be generated to enable receipt and response to messages without having to initialize the information handling system 200. In this manner, the information handling system 200 can be realized as a laptop or notebook system that can be used to receive messages that may be intended for a Blackberry or other type of messaging device as desired.

Figure 3:
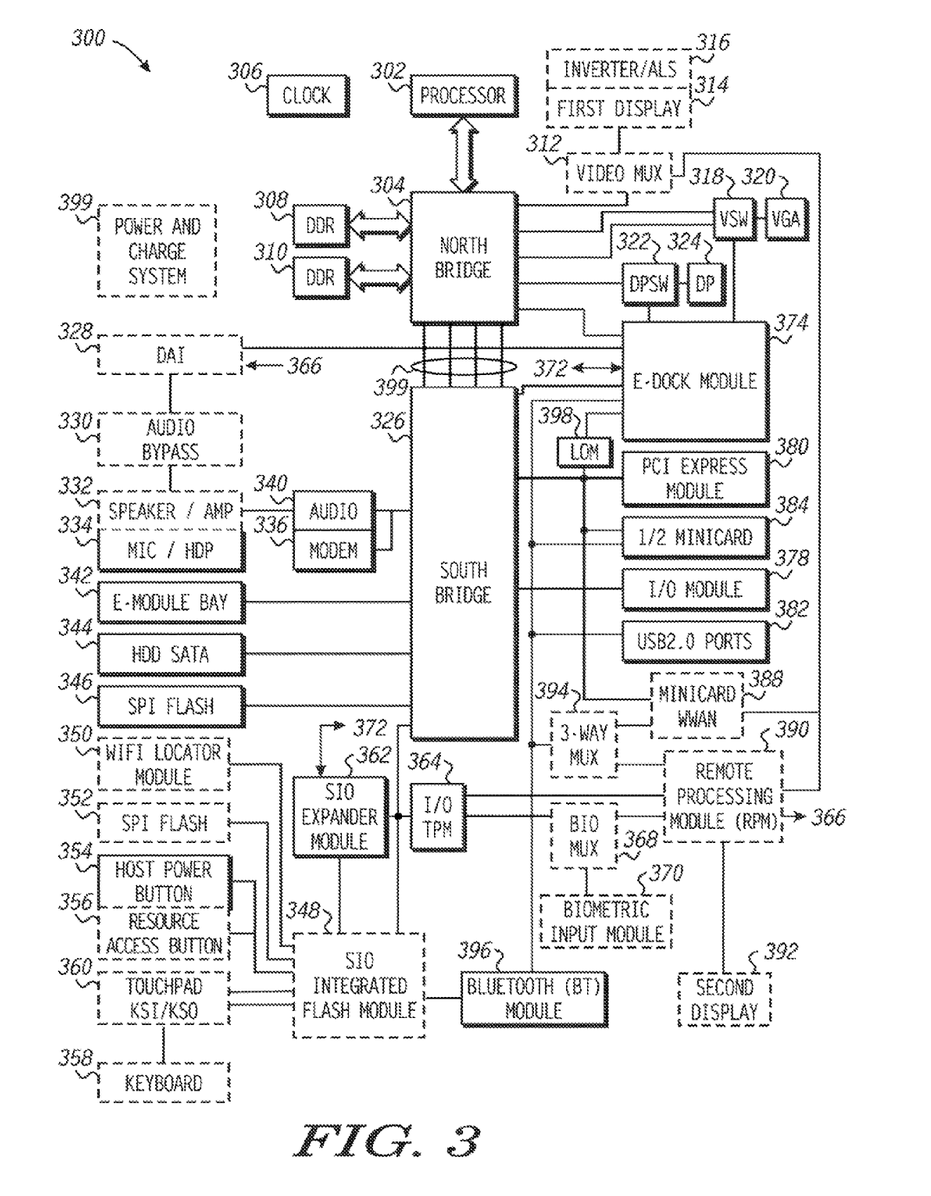
FIG. 3 illustrates a block diagram of the information handling system of FIG. 2 implementing power control according to one aspect of the present disclosure.

FIG. 3 illustrates a functional block diagram of an information handling system, illustrated generally at 300, employing reduced resources to respond to a designated system event one aspect of the disclosure. The information handling system 300 includes resources of the information handling system 200 illustrated in FIG. 2. Additionally, portions of the information handling system 200 can be placed in an appropriate power state to enable applications to output data and receive inputs using limited resources of the information handling system 300. For example, FIG. 3 illustrates several components having "dashed" lines, such as the display 314. As illustrated in FIG. 3, a dashed line indicates a resource that has been placed in an active power mode. Similarly, a component having a "solid" line, such as the processor 302, indicates a resource in a low-power mode. As such, the dashed lines and solid lines are provided only to illustrate in FIG. 3 components that are in a particular power mode and should not be interpreted in any way to further limit the functionality or capability of any components, devices, etc. of the information handling system 300.

During operation of information handling system 300, resources can be placed in a designated power mode in response to different events. For example, a user can select the Resource access button 356, and the SIO integrated flash 348 can initiate enabling resources to respond to the event. In one form, each of the keyboard 358, the touchpad KSI/KSO module 360, the SIO integrated flash 348, the MUX 368, the biometric input module 370, the three (3) way MUX 394, the BLT module 390, the MiniCard WWAN module 388, the second display 392, the DAI module 328, the audio bypass module 330, the speaker and amplifier 332, the power/charge system 399, the video MUX 312, the display 314, the inverter and ALS module 316, associated interconnect buses, or any combination thereof can be placed in an active mode in response to a designated event. After processing the event, the remote processing system 290 can return each resource to a low-power mode. Other modules can also be activated as needed or desired.

In the example illustrated in FIG. 3, various other devices or components of the information handling system 300 that are not to be used to output a BLT operating state can remain in a low-power state. For example, the processor 302 can be placed in a low-power state, or even in an 'off' state, wherein the processor may not be able to process data. As such, the information handling system 300 can enable a limited amount of resource sufficient to output a BLT operating state upon detecting an event to allocate a reduced set of resources sufficient to process, output, and receive inputs without the use of the processor 302 or other various resources. In this manner, the information handling system 300 need not initialize all components of the information handling system 300 to allow a user to access the BLT operating state of the information handling system 300.

For example, in one embodiment the information handling system 300 can be provided in a low-power operating state capable of receiving wireless communication signals using a wireless module, such as the MiniCard WWAN 388, the BT card 350, or another wireless module that can be coupled to the information handling system 300. The received wireless signal can be detected as an incoming signal configured to be received by a smart phone device, Blackberry device, or any other type of handheld wireless device. Upon identifying the information handling system 300 can place various resources in an active power mode to respond to a detected message. For example, in one form, the information handling system 300 can place a speaker in an active power state to output a user selected or customized audio output or beep that indicates a message has been received. The beep or audio output can be customized to identify a specific sender.

Specific resources of the information handling system 300 can be identified in the BT card 350 and enabled to enable an operating environment to output the message. For example, upon identifying receipt of a Blackberry message, resources such as the keyboard 358, the touchpad module 360, the SIO integrated flash module 348, the video MUX 312, the first display 314, the inverter and ALS 316, the power and charge system 399 and various charge circuits sufficient to power the allocated resources, and various interconnect circuits, buses, or combinations thereof sufficient to output the received message can be enabled. Additionally, an operating system and/or application can be initialized based on the type of message received. For example, the BLT module 390 can identify the message and can initialize an operating system and/or one or more applications sufficient to output a message. For example, an application sufficient to output a message or other messaging application can be initialized, and resources sufficient to output the message can be determined and enabled. In this manner, a limited number of components or resources, and an application and/or operating system can be placed in an appropriate power state to respond to a designate event, allowing the information handling system 300 to benefit from a reduced resource operating state, thereby conserving battery or power consumption while enabling access to a specific application (e.g. a Blackberry email application).

In one form, upon identifying an operating state to enable, an operating mode of the first display 314 can be identified. For example, the first display 314 can include a memory device storing an identifier including information to determine an operating capability of the first display 314. A backlight (not illustrated) of the first display 314 can be enabled, and a separate graphics display unit or processor (not illustrated) can be used to process and output content. For example, the first display 314 can also be capable of displaying information in a reduced power state that can include activating a backlight of the first display 314. As such, initializing a limited resource operating state of the information handling system 300 can include identifying an available operating state of the first display 314 and determining an operating state sufficient to output an operating environment using limited resources of the information handling system 300.

According to another aspect, the inverter and ALS module 316 can be used to determine an operating condition of the first display 314 in a limited resource operating state. For example, the inverter and ALS module 316 can be enabled and can detect an ambient light external to the information handling system 300 and automatically adjust the intensity or display output of the first display 314 during a limited resource operating state.

According to a further aspect, the Minicard WWAN 388 can incorporate the BLT module 390 using a processor of the Minicard WWAN 388. For example, the MiniCard WWAN can include to processors (not illustrated). A first processor can be used to process wireless signals and a second processor can detect information communicated within the wireless signals. The second processor can also be configured to provide the BLT module operable to identify a type of information received within the wireless signal, and to determine resources to enable to output a specific type of information received. For example, the BLT module 390 can identify an email communication within the wireless signal and can determine an email application and resources to output the email communication without having to initialize the entire information handling system 300.

Figure 4:
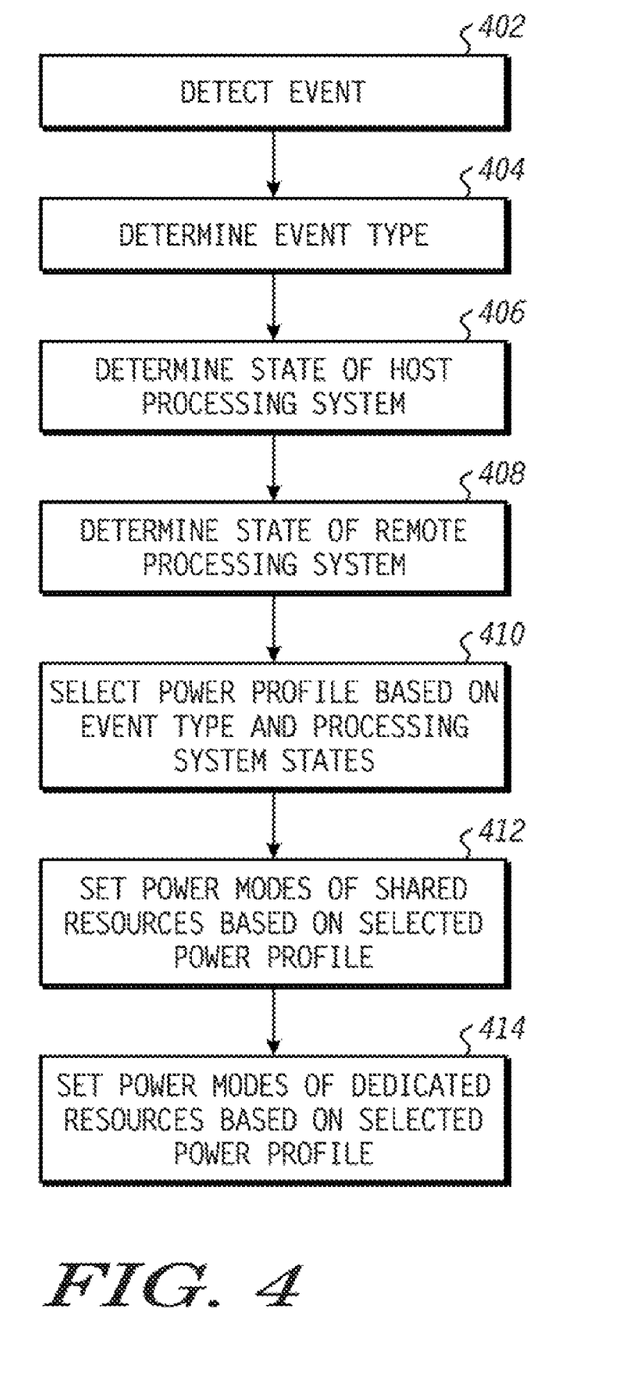
FIG. 4 illustrates a flow diagram of a method of managing power at an information handling system in accordance with one embodiment of the present disclosure.

FIG. 4 illustrates a flow diagram of a method of managing power at an information handling system according to one aspect of the present disclosure. At block 402, the event detection module 143 detects an event at information handling system 100. In response, at block 404, the event detection module 143 determines an event type. In addition, the event detection module 143 determines the state of the host processing system 102 at block 404 and determines the state of the remote processing system 104 at block 406. The state of each processing system can be determined based on the system state information 144.

The event detection module 143 communicates event information indicating the event type and the state of each processing system to the power control module 106. In response, at block 410, the power control module 106 selects one of the power profiles 145 based on the received event information. At block 412, based on the selected power profile, the power control module 106 sets the power mode for one or more of the shared resources 110. At block 414, based on the selected power profile, the power control module 106 sets the power mode for one or more of the dedicated resources 124, one or more of the dedicated resources 134, or both. Thus, the power mode of each system resource can be set based on the type of event and the state of each processing system.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    detecting a first event at a first processing system of an information handling system having a plurality of system resources;
    in response to detecting the first event at the first processing system, determining a first power mode for a first system resource based on the first event, first state information indicative of a state of the first processing system wherein the first state information indicates an operating system associated with the first processing system, and second state information indicative of a state of a second processing system of the information handling system, wherein the first power mode is one of an active power mode and a reduced power mode, wherein the reduced power mode is an operational power mode, the first system resource to retain state information in the reduced power mode; and
    setting an operating power mode of the first system resource to the first power mode.

2. The method of claim 1, wherein the first system resource comprises a resource that is shared between the first processing system and the second processing system.

3. The method of claim 1, wherein the first system resource comprises a dedicated resource of the first processing system that is not shared with the second processing system.

4. The method of claim 1, further comprising:
    in response to detecting the first event at the first processing system, determining a second power mode for a second system resource based on the first event, the state of the first processing system, and the state of the second processing system; and
    setting a power mode of the second system resource to the second power mode.

5. The method of claim 4, wherein the first system resource is a dedicated resource of the first processing system, and the second system resource is a dedicated resource of the second processing system.

6. The method of claim 1, wherein the first state information corresponds to a plurality of operating power modes associated with a plurality of system resources.

7. The method of claim 1, wherein further comprising selecting the operating power mode from a plurality of available power modes for the first system resource based on an event type associated with the first event.

8. The method of claim 1, further comprising:
    in response to detecting a second event at the second processing system, determining a second power mode for a second system resource based on the second event, the state of the first processing system, and the state of the second processing system; and
    setting a power mode of the second system resource to the second power mode.

9. The method of claim 1, further comprising:
    detecting a second event at the second processing system;
    in response to detecting the second event at the second processing system, determining a second power mode for the first system resource based on the second event, the state of the first processing system, and the state of the second processing system; and
    setting the power mode of the first system resource to the second power mode.

10. A processor readable medium tangibly embodying a program of instructions to manipulate a processor, the program of instructions comprising instructions to:
    detect a first event at an information handling system;
    in response to the first event:
        select a first power profile from a plurality of available power profiles on the first event; and
        set an operational power mode of a first plurality of system resources of the information handling system based on the first power profile, the first plurality of system resources comprising resources that are shared between a first processing system of the information handling system and a second processing system of the information handling system, wherein the first power profile associates a first system resource of the first plurality of system resources with a low-power mode, and the second power profile associates the first system resource with an active mode.

11. The processor readable medium of claim 10, wherein the instructions to select the first power profile comprise instructions to select the first power profile based on a state of the first processing system and a state of the second processing system.

12. The processor readable medium of claim 10, wherein the program of instructions further comprises instructions to:
    in response to detecting a second event:
        select a second power profile from a plurality of available power profiles based on the second event; and
        set the power mode of each of the first plurality of system resources of the information handling system based on the second power profile.

13. The processor readable medium of claim 10, wherein the program of instructions further comprises instructions to:
    in response to detecting the first event, set an operational power mode of each of a second plurality of system resources based on the first power profile, the second plurality of system resources comprising dedicated resources of the first processing system.

14. The processor readable medium of claim 13, wherein the program of instructions further comprises instructions to:
    in response to detecting the first event, set an operational power mode of each of a third plurality of system resources based on the first power profile, the third plurality of system resources comprising dedicated resources of the second processing system.

15. An information handling system, comprising:
a first processing system;
a second processing system;
a first plurality of system resources comprising shared resources between the first processing system and the second processing system;
an event detection module configured to detect an event at the information handling system and communicate a first indication in response to the event;
a power control module configured to, in response to the first indication, select a first power profile from a plurality of available power profiles based on an the first event and configured to set a power mode of each of the first plurality of system resources based on the first power profile, wherein the power mode is an operational power mode, the first system resource to retain state information in the power mode; and
a second plurality of system resources comprising dedicated resources of the first processing system;
wherein the power control module is configured to, in response to the first indication, set a power mode of each of the second plurality of system resources based on the first power profile.

16. The information handling system of claim 15, wherein:
the event detection module is configured to detect a second event and communicate a second indication in response to the second event; and
the power control module is configured to, in response the second indication, select a second power profile from the plurality of available power profiles based on the second event and configured to set the power mode of each of the first plurality of system resources based on the second power profile.

17. The information handling system of claim 15, wherein the power control module is configured to select the first power profile based on a state of the first processing system and a state of the second processing system.

* * * * *